United States Patent [19]

Maehara

[11] Patent Number: 5,020,623
[45] Date of Patent: Jun. 4, 1991

[54] TRACTION CONTROL SYSTEM

[75] Inventor: Toshifumi Maehara, Saitama, Japan

[73] Assignees: Akebono Brake Industry Co., Ltd., Tokyo; Akebono Research Development Centre Ltd., Saitama, both of Japan

[21] Appl. No.: 376,523

[22] Filed: Jul. 7, 1989

[30] Foreign Application Priority Data

Jul. 25, 1988 [JP] Japan .................. 63-183674

[51] Int. Cl.$^5$ .......................................... B60K 28/16
[52] U.S. Cl. .................................. 180/197; 74/470; 74/501.5 H; 74/513; 123/342; 123/360
[58] Field of Search .............. 180/197; 123/396, 399, 123/400, 401, 342, 352, 360; 74/470, 513, 501.5

[56] References Cited

U.S. PATENT DOCUMENTS

| | | | |
|---|---|---|---|
| 2,139,832 | 12/1938 | Leibing | 123/342 |
| 2,627,850 | 2/1953 | Willim | 123/342 |
| 3,923,020 | 12/1975 | Gilligan | 123/342 |
| 4,077,370 | 3/1978 | Spangenberg | 123/342 |
| 4,362,138 | 12/1982 | Krueger et al. | 123/342 |
| 4,530,326 | 7/1985 | Mann et al. | 123/342 |
| 4,736,814 | 4/1988 | Yogo et al. | 180/197 |
| 4,811,809 | 3/1989 | Reinartz et al. | 123/342 |
| 4,834,044 | 5/1989 | Maas | 123/342 |
| 4,860,848 | 8/1989 | Barth et al. | 180/197 |

FOREIGN PATENT DOCUMENTS

| | | | |
|---|---|---|---|
| 1195087 | 6/1965 | Fed. Rep. of Germany | 123/396 |
| 3237672 | 4/1984 | Fed. Rep. of Germany | 180/197 |

*Primary Examiner*—Mitchell J. Hill
*Attorney, Agent, or Firm*—Finnegan, Henderson, Farabow, Garrett, and Dunner

[57] ABSTRACT

A traction control system includes a control rod connected to a throttle lever and being slidable with respect to a housing to which an accelerator pedal is connected. The control rod is movable in response to a driving wheel acceleration slip signal so as to return the throttle lever. A control device controls the movement of the control rod. A set spring acts between the control rod and the housing. The set spring has such a spring force that the set spring is not compressed by the pressing-down of the accelerator pedal in the absence of the driving wheel acceleration slip signal, so that the control rod can be moved together with the housing. The spring force of the set spring is such that during the above movement of the control rod, the set spring is compressed when the accelerator pedal is strongly pressed down.

18 Claims, 4 Drawing Sheets

TRACTION CONTROL SYSTEM

FIELD OF THE INVENTION

The present invention relates to a traction control for a vehicle such as an automobile which system prevents a driving wheel from slipping while the vehicle accelerates, for example, at the time of starting the vehicle.

BACKGROUND OF THE INVENTION

One conventional traction control system is of the type in which a throttle valve of a carburentur is operated by a stepping motor or the like, and the stepping motor is controlled by an electronic control device. Another conventional traction control system is of the type in which the injection of the fuel is controlled.

With respect to the conventional traction control system utilizing a stepping motor, intake valves of the engine and other parts need to be changed, and the control is rather complicated resulting in high costs.

SUMMARY OF THE INVENTION

The present invention has been made in view of the defect and difficulty accompanying conventional traction control systems.

More specifically, it is an object of this invention to provide a traction control system which is simple in construction and requires relatively low cost in manufacturing.

It is another object of the invention to provide a traction control system capable of achieving an optimum starting acceleration of the vehicle and making the best use of the adhesion between the tire and the road surface.

According to the present invention, there is provided a traction control system comprising a housing connected to an accelerator pedal; a control rod connected to a throttle lever and being slidable with respect to the housing, the control rod being movable in response to a driving wheel acceleration slip signal so as to return the throttle lever; a control device for controlling the movement of the control rod; and a set spring acting between the control rod and the housing.

In the traction control system of the invention thus constructed, the set spring having a predetermined spring force is not compressed by the pressing-down operation of the accelerator pedal in the absence of the driving wheel acceleration slip signal. Thus the control rod can move together with the housing, and the spring force being such that during the above movement of the control rod, the set spring is compressed while the accelerator pedal is strongly pressed down.

If there is no driving wheel acceleration slip signal, that is, when no slip of the vehicle occurs, the control device does not operate, and the throttle lever is not returned by the control rod. Therefore, the control rod moves together with the housing in response to the actuation amount of the accelerator pedal, so that the throttle lever angularly moves in response to the operation of the accelerator pedal.

When the driving wheel acceleration slip starts to occur, the control device is responsive to the driving wheel acceleration slip signal to move the throttle lever in its returning direction through the control rod, thereby reducing the traction force to eliminate the acceleration slip of the driving wheel.

During the above returning operation of the control rod, if the accelerator pedal is lightly pressed down, the set spring is not compressed and therefore, the accelerator pedal returns to its normal position together with the housing and the control rod. On the other hand, if the accelerator pedal is strongly pressed down, the set spring is compressed, and the housing and the accelerator pedal do not return.

Thus, regardless of the degree of the pressing-down of the accelerator pedal, the traction control can suitably be carried out to eliminate the driving wheel acceleration slip.

The accelerator pedal and the throttle lever are connected together through the housing, the control rod and the set spring, and the control rod returns in accordance with the level of the driving wheel acceleration slip.

Thus, the present invention can be achieved by the addition of such a quite simple arrangement (that is, the provision of the housing, the control rod and the set spring between the accelerator pedal and the throttle lever), and it is not required to provide an extensive change in construction, such as the provision of a stepping motor on the throttle, as is the case with conventional traction control devices.

DESCRIPTION OF THE PREFERRED EMBODIMENT

The present invention will now be described in detail with reference to the accompanying drawings.

A throttle lever cable 3 is connected at one end thereof to a throttle lever 2. When a valve 1 of a carburetur rotates counterclockwise as indicated by an arrow A shown in FIG. 1, the amount of supply of a fuel to an engine increases.

Figures 1, 2:
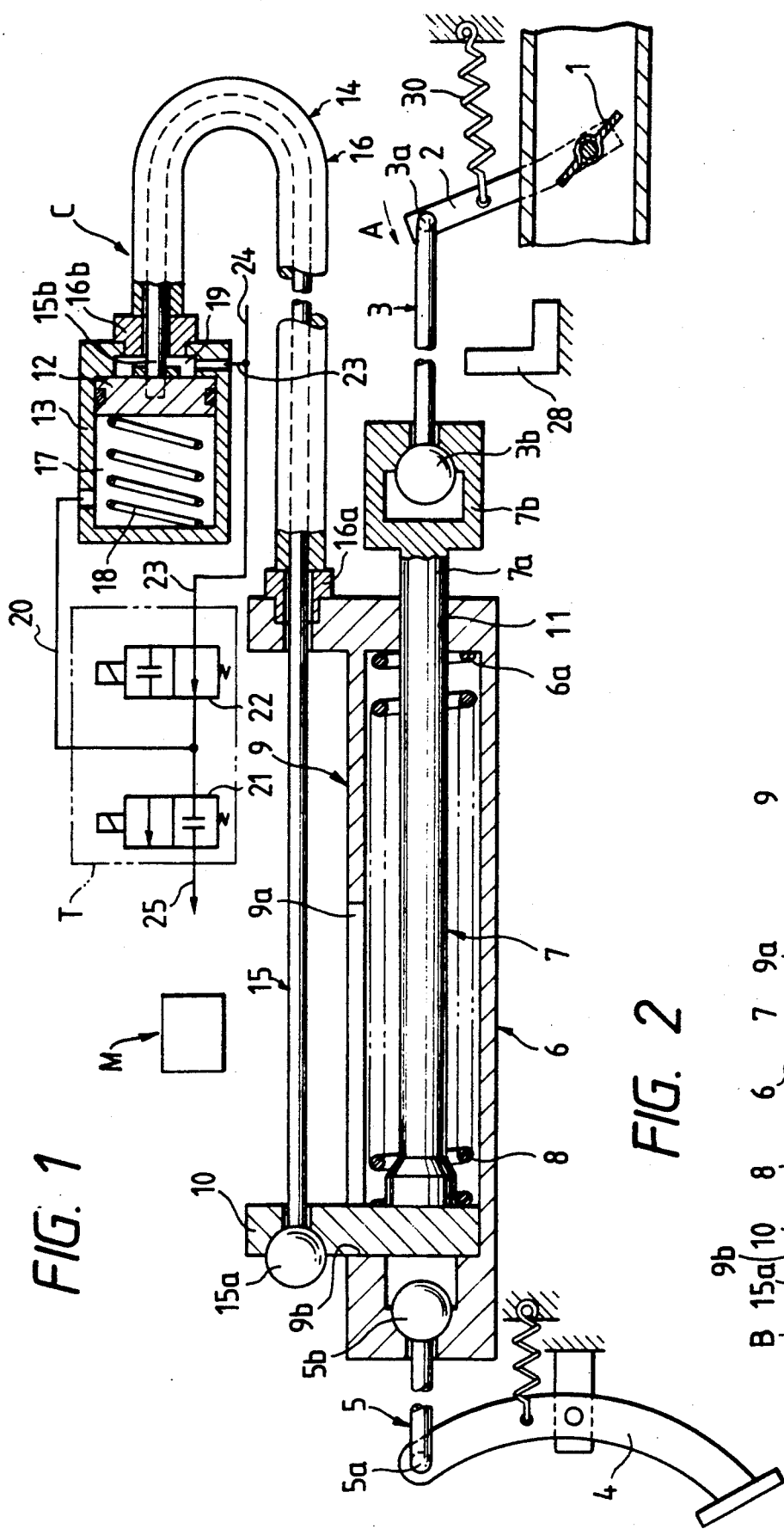
FIG. 1 is a cross-sectional view of an essential part of a traction control system according to the present invention.
FIG. 2 is a fragmentary plan view of the traction control system shown in FIG. 1.
Figure 3:
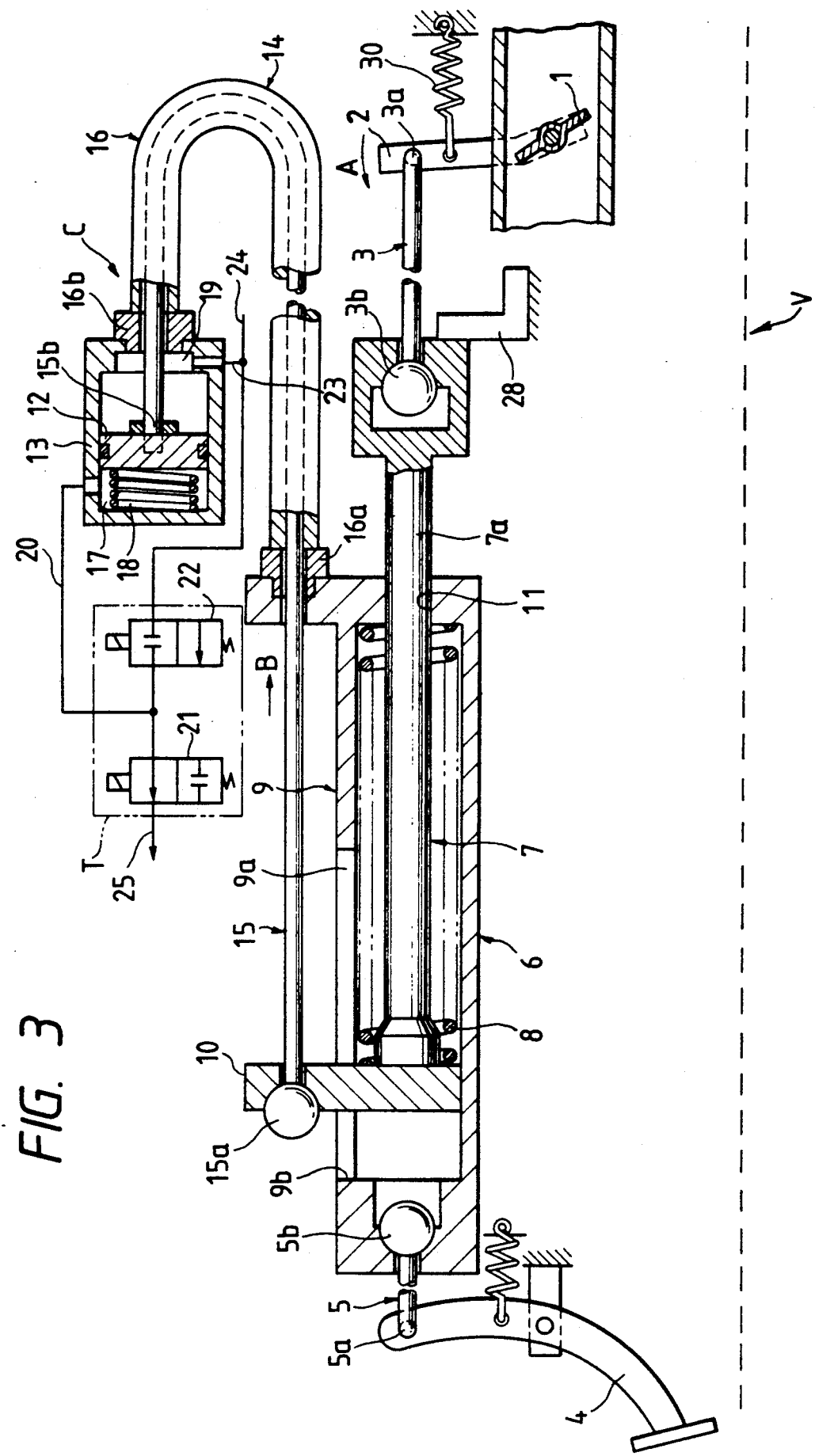
FIG. 3 is a view of the traction control system similar to FIG. 1 but showing a different operative condition therefrom.

An accelerator pedal cable 5 is connected at one end 5a to an accelerator pedal 4, and a connecting part 5b of the cable 5 is connected to a housing 6 which is movable with respect to a vehicle body V (as shown in FIG. 3) in right and left directions in FIG. 1.

A control rod 7 is accommodated in the housing 6 for sliding movement therealong, and a connecting part 3b of the throttle lever cable 3 is connected to an end portion 7b of the control rod 7. A set spring 8 is mounted within the housing 6 and wound around the control rod 7, the set spring 8 acting between one end wall of the housing 6 and a plate 10 formed integrally with the control rod 7 so that the control rod 7 is normally urged toward the accelerator pedal 4. The force or bias of the set spring 8 is greater than that of a return spring 30 for returning the throttle lever 2.

The housing 6 has a slot 9a formed in an upper wall 9 of the housing 6 and extending along a longitudinal direction thereof. The plate 10, formed integrally with one end of the control rod 7 disposed close to the accelerator pedal 4, extends exteriorly of the housing 6 through the slot 9a and is slidable therein. The sliding movement of the control rod in opposite directions along the axis of the housing 6 is guided by the slot 9a in which the plate 10 is slidably received and also by a guide opening 11 which is formed through the one end wall of the housing 6 and which slidably receives therein that portion of the cross-sectionally circular shank portion 7a of the control rod 7 disposed close to the throttle lever 2.

Therefore, the plate 10 is normally urged by the set spring 8 against one end 9b of the slot 9a of the housing disposed close to the accelerator pedal 4.

A control device C is responsive to a driving wheel acceleration signal for moving the control rod 7 in a direction toward the throttle lever 2 (that is, in a direction opposite to the direction of the arrow A).

The control device C comprises a control valve device T, a control cylinder 13 having a piston 12 slidably received therein, and a cable unit 14 for transmitting the movement of the piston 2 to the control rod 7.

The cable unit 14 comprises an inner cable 15 connected at a connecting part 15a thereof to the plate 10 and also connected at the other end 15b to the piston 12. The cable unit 14 also comprises an outer cable 16 which covers or encloses the inner cable 15. One end portion 16a of the outer cable 16 is connected to the housing 6 while the other end 16b is connected to the control cylinder 13 fixedly mounted on the vehicle body.

The piston 12 is mounted in a greater-diameter chamber 17 of the control cylinder 13 and is urged toward a smaller-diameter chamber 19 of the control cylinder 13 by a spring 18.

The greater-diameter chamber 17 communicates via a conduit 20 to first and second valves 21 and 22 of the control valve device T, that is, to a conduit communicating the first and second valves 21 and 22. The smaller-diameter chamber 19 is communicated via a conduit 23 to the second valve 22 and the ambient atmosphere 24.

The first valve 21 is communicated via a conduit 25 to a negative pressure source such as an intake manifold M of the engine (as shown in FIG. 1).

The first valve 21 of the control valve device T is of the normally-closed solenoid type, and the second valve 22 is of the normally-open solenoid type.

Figure 4:
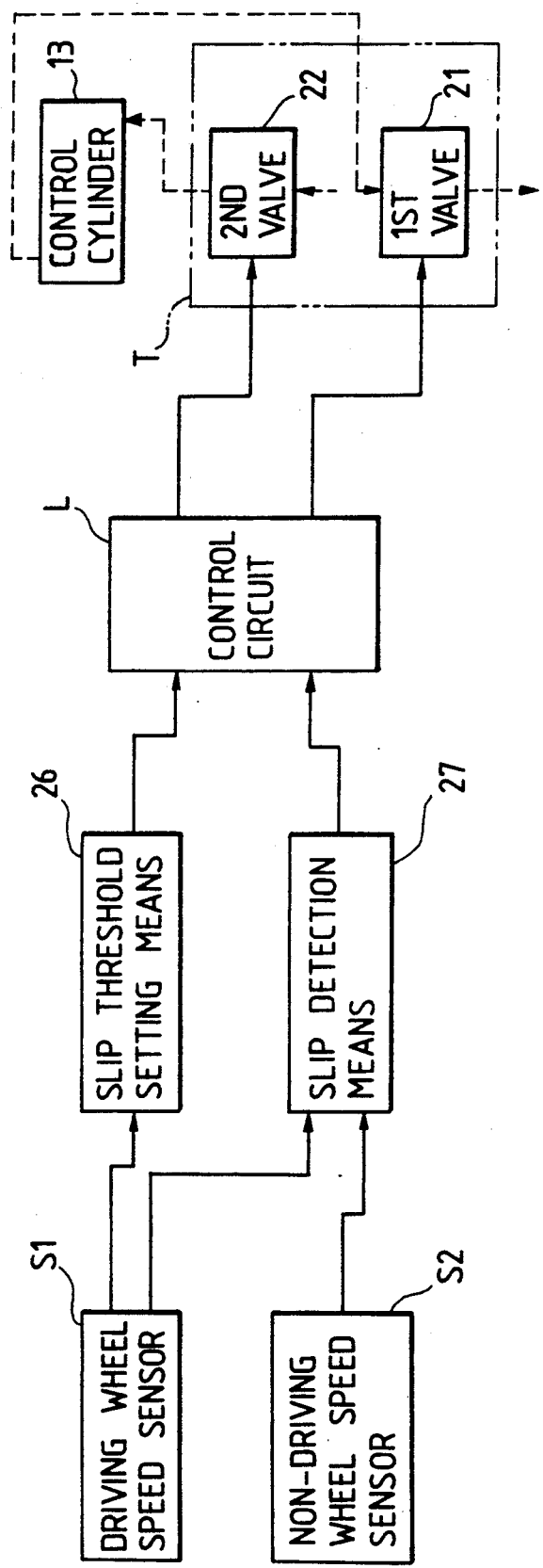
FIG. 4 is a block diagram of a control portion of the traction control system of the invention.

FIG. 4 is a block diagram of a control portion of the traction control system of the invention. As shown in FIG. 4, a driving wheel speed sensor S detects the speed of the driving wheel, and a non- driving wheel speed sensor $S_2$ detects the speed of the non- driving wheel. The two wheel speed sensors $S_1$ and $S_2$ feed their output signals to a slip detection means 27 where the speed of the non-driving wheel is compared with the speed of the driving wheel to determine a slip of the driving wheel. A slip threshold value setting means 26 outputs a slip threshold value to a control circuit L, and the output signal of the slip detection means 27 representative of the acceleration slip of the driving wheel is also fed to the control circuit L. In accordance with the amount of the acceleration slip of the driving wheel relative to the slip threshold value, the control circuit L controls the operation of the valves 21 and 22 to selectively open or close them.

When no wheel slip occurs, the first valve 21 closes and the second valve 22 opens as shown in FIG. 1, so that the opposite sides of the piston 12 are both at an atmospheric pressure. Therefore, the piston 12 does not impart a depressing force to the inner cable 15, and the plate 10 formed integrally with the control rod 7 is held against the end 9b of the housing 6. In this case, the throttle lever 2 is operated and controlled only by the accelerator pedal 4 via the housing 6 and the throttle cable 3.

When the slip rate of the driving wheel increases so that the difference between this slip rate and the slip threshold value exceeds a predetermined value, the control circuit L outputs a driving wheel acceleration slip signal to open the first valve 21 and to close the second valve 22 as shown in FIG. 3. As a result, the pressure within the greater-diameter chamber 17 is decreased to cause the piston 12 to retract the inner cable 15 in a direction of an arrow B indicated in FIG. 3, so that the control rod 7 returns the throttle lever 2 in the direction opposite to the arrow A to thereby reduce the traction force of the engine.

During this throttle returning operation, if the accelerator pedal 4 is lightly pressed down, the set spring 8 is not compressed, and the housing 6 moves in the direction of the arrow B together with the inner cable 15 and the control rod 7, so that the accelerator pedal 4 is subjected to a kick-back. On the other hand, if the accelerator pedal 4 is strongly pressed down, the set spring 8 is compressed, and only the control rod 7 moves in the direction of the arrow B together with the inner cable 15.

Therefore, when the driving wheel acceleration slip signal is outputted, the throttle lever 2 is returned in accordance with the value of this outputted signal regardless of the degree of the pressing-down force applied to the accelerator pedal 4. Accordingly, the driver feels a normal returning force corresponding to the pressing-down force and, therefore, realizes the initiation of the traction control and the degree of such traction control.

The maximum amount of return of the throttle lever 2 is determined by a stopper 28 fixedly mounted on the vehicle body stopper 28 engages the end of the control rod 7 which is remote from the accelerator pedal 4, to limit the returning movement of the throttle lever 2.

Figure 5:
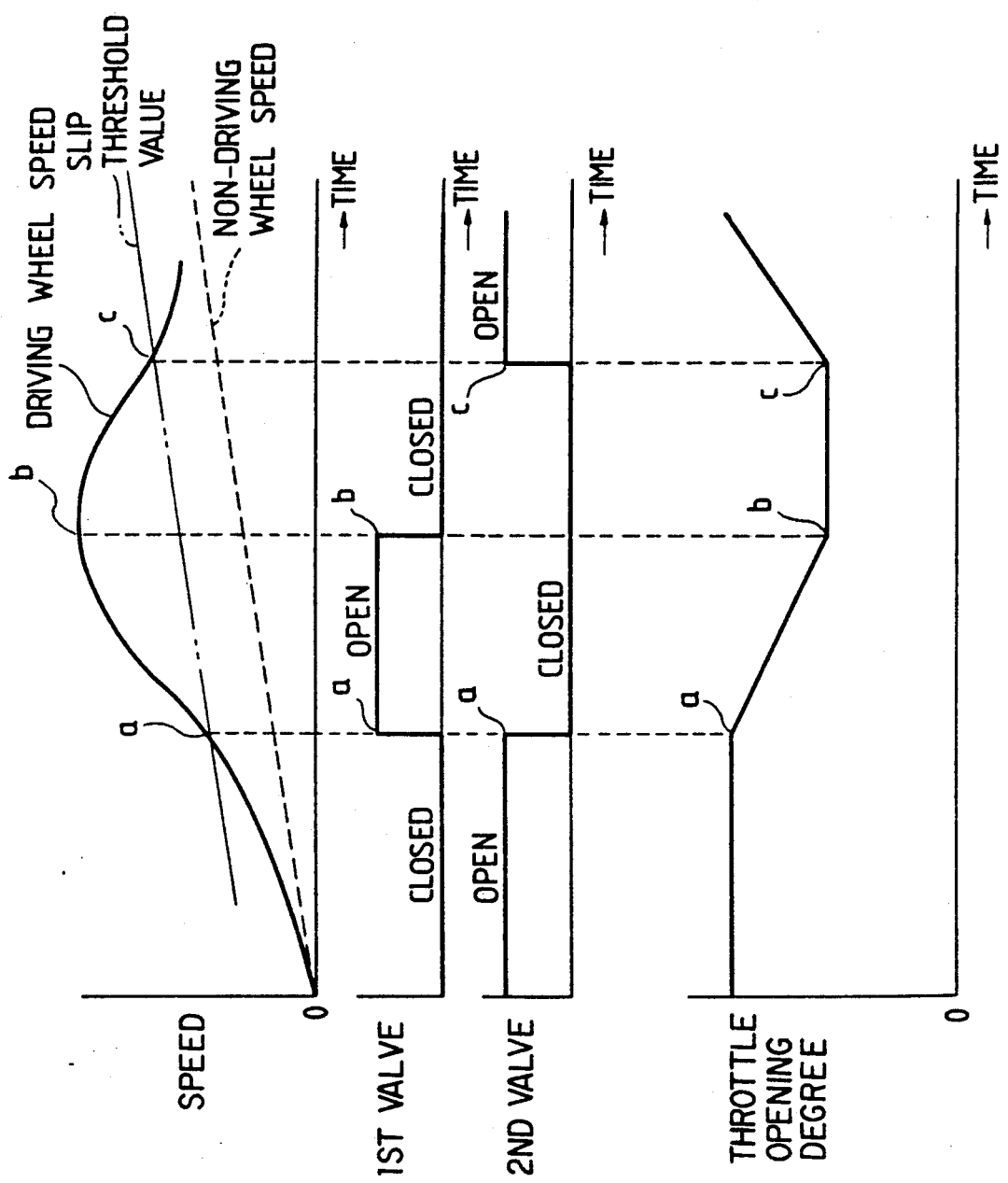
FIG. 5 is a diagrammatical illustration showing control characteristics of the traction control system of the invention.

FIG. 5 shows characteristics of the staring acceleration slip control system according to the invention.

When the accelerator pedal 4 is pressed down so as to start the vehicle, the first valve 21 closes and the second valve 22 opens. Therefore, the control cylinder 13 does not operate, and the start of the vehicle is at first controlled only by the pressing-down of the accelerator pedal 4.

When the vehicle accelerates to thereby increase the slip of the driving wheel, the speed of the driving wheel reaches the slip threshold value at a point a shown in FIG. 5. At the point a, a driving wheel acceleration slip signal is outputted from the control circuit L. As a result, the first valve 21 opens, and the second valve 22 closes, so that the pressure within the greater- diameter chamber 17 is reduced to move the piston 12 in a direction away from the smaller-diameter chamber 19. Therefore, the piston 12 allows the inner cable 15 to return the throttle lever 2 in the direction opposite to the arrow A through the control rod 7, so that the engine torque decreases to thereby gradually reduce the degree of increase of the speed of the driving wheel.

If the accelerator pedal 4 is lightly pressed down, the accelerator pedal 4 is returned together with the housing 6 when the inner cable 15 is moved or retracted. On the other hand, if the accelerator pedal 4 is strongly pressed down the set spring 8 is compressed and therefore the housing 6 is not moved, and the accelerator pedal 4 does not return.

At a point b when the speed of the driving wheel reaches a high peak value, the first valve 21 closes in response to instruction from the control circuit L. Therefore, the piston 12 is held stationary at that position to stop the returning movement of the throttle lever 2 to thereby maintain the degree of opening of the throttle at that level.

At a point c when the slip of the driving wheel further decreases to the threshold value, the control circuit L feeds a valve-opening instruction to the second valve 22 to open the same. As a result, atmosphere 16 air at 24 flows into the greater-diameter chamber 17 to move the piston 12 toward the smaller-diameter chamber 19, so that the inner cable 15 moves in the direction opposite to the arrow B. Therefore, the throttle lever 2 rotates counterclockwise in the direction of the arrow A and the control rod 7 moves leftwardly in the figures to increase the degree of throttle opening to allow the vehicle to accelerate again.

As described above, in accordance with variations in the speed of the driving wheel, the first and second valves 21 and 22 are repeatedly opened and closed under the instruction of the control circuit L to thereby achieve the optimum starting acceleration control, making the best use of the adhesion between the tire and the road surface.

The principles of the above control by the control circuit L can be applied to other various known constructions than the illustrated embodiment.

The control valve device T may be of the type utilizing a positive air pressure or a fluid pressure.

The control circuit L, the slip threshold value-setting means 26 and the slip detection means 27 may be constituted by a microcomputer.

As described above, in the traction control system of the present invention, if the accelerator pedal is lightly pressed down when the wheel acceleration slip occurs, the housing and the accelerator pedal move together with the control rod in the throttle-returning direction. On the other hand, if the accelerator pedal is strongly pressed down when the wheel acceleration slip occurs, the set spring is compressed, so that the accelerator pedal and the housing do not move, and only the control rod 7 is moved in the throttle returning direction.

Thus, regardless of the amount or degree of pressing-down of the accelerator pedal 4, the driving wheel acceleration slip control is suitably carried out.

The traction control by the driver through the accelerator pedal 4 and the automatic traction control in accordance with the degree of acceleration of the driving wheel are always carried out in combination. Therefore, the driver's intention can be reflected in the traction control so long as the slip is not excessive, thus achieving a rational traction control.

The accelerator pedal and the throttle lever are connected together through the housing, the control rod and the set spring, and the control rod returns in accordance with the value of the driving wheel acceleration slip signal. Thus, the present invention can be achieved by the addition of such a quite simple arrangement (that is, the provision of the housing 6, the control rod 7, etc., between the accelerator pedal 4 and the throttle lever 2), and there is not required an extensive change in construction, such as the mounting of a stepping motor on the throttle, as is the case with the conventional traction control system.

When the accelerator pedal is lightly pressed down, the accelerator pedal returns by the movement of the control rod in accordance with the wheel acceleration slip signal to produce a kick-back. This tells the driver that too much pressure is being applied to the accelerator pedal.

What is claimed is:

1. A traction control system of the type including motive control components of a vehicle for preventing a vehicle driving wheel from slipping when the vehicle is accelerated, the system comprising:
   a housing connected to an accelerator pedal of the vehicle;
   a control rod connected to a throttle lever of the vehicle, said control rod being accommodated and slidably movable within said housing;
   a control device interconnected with said control rod for controlling the movement of said control rod within said housing; and
   means including a set spring in communication with said control rod and disposed within said housing for moving the control rod together with said housing towards said throttle lever when said vehicle driving wheel slips during acceleration and said accelerator pedal is lightly pressed, and for moving only said control rod towards said throttle lever when said accelerator pedal is strongly pressed and said set spring is compressed.

2. The traction control system according to claim 1, wherein said control device comprises a control valve device, a control cylinder in communication with said control valve device and having a piston slidably mounted therein, and a cable unit in connection with said piston fore transmitting the movement of said piston within said control cylinder to said control rod.

3. The traction control system according to claim 2, wherein said control valve device utilizes positive air pressure.

4. The traction control system according to claim 2 wherein said control valve device utilizes fluid pressure.

5. The traction control system according to claim 2 wherein said housing includes a slot extending longitudinally therein.

6. The traction control system according to claim 5 further comprising a plate integrally connected to an end of said control rod in the vicinity of the accelerator pedal, said plate extending through and being axially slidable in said slot, wherein the sliding movement of said control rod within said housing is guided by said slot.

7. The traction control system according to claim 6 further comprising a guide hole formed through an end wall of said housing, wherein said guide hole slidably receives a circular portion of said control rod in the vicinity of said throttle lever.

8. The traction control system according to claim 6, wherein said plate is normally urged by said set spring against an end of said slot, said end of said slot being disposed close to said accelerator pedal.

9. The traction control system according to claim 6, wherein said cable unit comprises:
   an inner cable having opposed ends, said inner cable being connected at one end to said plate and connected at the other end thereof to said piston of said control cylinder; and an outer cable having opposed ends and covering said inner cable, said outer cable having one end connected to said housing, and the other end being connected to said control cylinder which is fixedly mounted on the vehicle.

10. The traction control system according to claim 9, wherein said control cylinder includes a greater-diameter chamber and a smaller-diameter chamber, wherein said piston is received in said greater-diameter chamber, said control cylinder including a spring disposed in said greater diameter chamber to urge said piston toward said smaller-diameter chamber.

11. The traction control system according to claim 10, wherein said control valve device comprises a first valve of the normally-closed solenoid type, and a second valve of the normally-open solenoid type.

12. The traction control system according to claim 11, wherein said greater-diameter chamber is communicated via a conduit to a conduit interconnecting said first and second valves of said control valve device, and wherein said smaller-diameter chamber communicates via a conduit with said second valve and the atmosphere, connecting and means including a negative pressure source for connecting said first valve to said interconnecting conduit 13. The traction control system according to claim 12 wherein the said connecting means including said negative pressure source is provided by an engine manifold of the vehicle.

14. The traction control system according to claim 11 further comprising a control portion in communication with said control valve device, said control portion including a driving wheel slip threshold valve setting means for supplying a slip threshold value to a control circuit and a slip detection means for comparing the speed of a non-driving wheel with the speed of the driving wheel to determine a slip rate of the driving wheel and to provide said slip rate to said control circuit.

15. The traction control system according to claim 14 wherein, when the speed of the vehicle driving wheel reaches said slip threshold value, said control circuit including means for generating a driving wheel acceleration slip signal.

16. The traction control system according to claim 15 wherein, when the vehicle driving wheel does not slip and said control circuit does not generate said driving wheel acceleration slip signal, the control portion comprises means for limiting said throttle lever to move in response only to the pressing of said accelerator pedal.

17. The traction control system according to claim 16 wherein, when said slip rate increases such that a difference between said slip rate and slip threshold value exceeds a predetermined value and said control circuit generates said driving wheel acceleration slip signal, the control portion includes means for opening said first valve, for closing said second valve, for decreasing the pressure in said greater diameter chamber, and for causing said piston to retract and pull said inner cable, causing said control rod to move said throttle lever in a direction to reduce the acceleration of the vehicle.

18. The traction control system according to claim 17, including a stopper fixed on the vehicle for determining a maximum amount of movement of said throttle lever said stopper engaging an end of the control rod to limit the movement of the throttle lever.

* * * * *

UNITED STATES PATENT AND TRADEMARK OFFICE
CERTIFICATE OF CORRECTION

PATENT NO.   : 5,020,623
DATED        : June 04, 1991
INVENTOR(S)  : Toshifumi Maehara It is certified that error appears in the above-identified patent and that said Letters Patent is hereby corrected as shown below:

Claim 12, column 7, line 25, add --.-- (period) after "conduit".

Signed and Sealed this

Sixth Day of April, 1993

*Attest:*

STEPHEN G. KUNIN

*Attesting Officer*     *Acting Commissioner of Patents and Trademarks*